United States Patent
Chen et al.

(10) Patent No.: US 7,471,855 B2
(45) Date of Patent: Dec. 30, 2008

(54) MONLITHICALLY COUPLED WAVEGUIDE AND PHOTOTRANSISTOR

(75) Inventors: Young-Kai Chen, Berkeley Heights, NJ (US); Vincent Etienne Houtsma, Berkeley Heights, NJ (US); Andreas Bertold Leven, Gillette, NJ (US); Nils Guenter Weimann, Gillette, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 84 days.

(21) Appl. No.: 11/180,122

(22) Filed: Jul. 13, 2005

(65) Prior Publication Data

US 2007/0014508 A1  Jan. 18, 2007

(51) Int. Cl.
*G02B 6/12* (2006.01)
(52) U.S. Cl. .......................... 385/14; 385/31
(58) Field of Classification Search ............ None
See application file for complete search history.

(56) References Cited

U.S. PATENT DOCUMENTS

| | | | | |
|---|---|---|---|---|
| 4,136,928 | A | 1/1979 | Logan et al. | 350/96.11 |
| 4,904,036 | A | 2/1990 | Blonder | 350/96.11 |
| 5,391,869 | A * | 2/1995 | Ade et al. | 250/227.24 |
| 6,335,255 | B1 * | 1/2002 | Evaldsson et al. | 438/314 |
| 6,759,694 | B1 * | 7/2004 | Hsu et al. | 257/187 |
| 6,911,716 | B2 | 6/2005 | Chen et al. | 257/586 |
| 2003/0015720 | A1 * | 1/2003 | Lian et al. | 257/98 |
| 2004/0026712 | A1 * | 2/2004 | Scott et al. | 257/184 |

FOREIGN PATENT DOCUMENTS

JP  2001189488 A  *  7/2001

OTHER PUBLICATIONS

K. Sano et al., *Radio Frequency Integrated Circuits Symposium*, pp. 313-316 (Jun. 2004).
M. Bitter et al., *IEEE Photonics Tech. Lett.*, vol. 12, No. 1, pp. 74-76 (Jan. 2000).
D. Ritter et al., *Proc. Intl. Topical Meeting Microwave Photonics*, pp. 337-340 (2002).
A. Leven et al., *Electr. Lett.*, vol. 40, No. 13, pp. 833-834 (Jun. 2004).
H. Kamitsuna et al., *IEEE J. of Selected Topics in Quant. Electr.*, vol. 10, No. 4, pp. 673-678 (Jul./Aug. 2004).
H. Kamitsuna et al., *IEEE Trans. MTT*, vol. 49, No. 10, pp. 1921-1925 (Oct. 2001).
M. Rodwell et al., *IEEE Trans. Electron. Dev.*, vol. 48, No. 11, pp. 2606-2624 (Nov. 2001).
Y. Yang et al., *GaAs Digest*, pp. 269-272 (2002).
J. P. Vilcot, *Proc. EDMO*, pp. 163-168 (1997).
H. Ito et al., *Proc. LEOS*, San Diego, CA, vol. 1, pp. 386-387 (2001).

* cited by examiner

*Primary Examiner*—Sung H Pak

(57) ABSTRACT

An optical integrated circuit comprises a semiconductor body, a semiconductor optical waveguide located on the body, and a bipolar phototransistor located on and optically coupled to the waveguide. In a preferred embodiment, the base region of the transistor is configured to absorb radiation propagating in the waveguide, but the emitter and collector regions are both configured not to absorb the propagating radiation. In a further preferred embodiment, the waveguide is configured to guide the radiation along a propagation axis therein, and the transistor makes an elongated footprint along the waveguide, the footprint being elongated along the direction of the propagation axis. In another preferred embodiment, the footprint is at least three times longer along the propagation axis than along a direction perpendicular thereto.

14 Claims, 4 Drawing Sheets

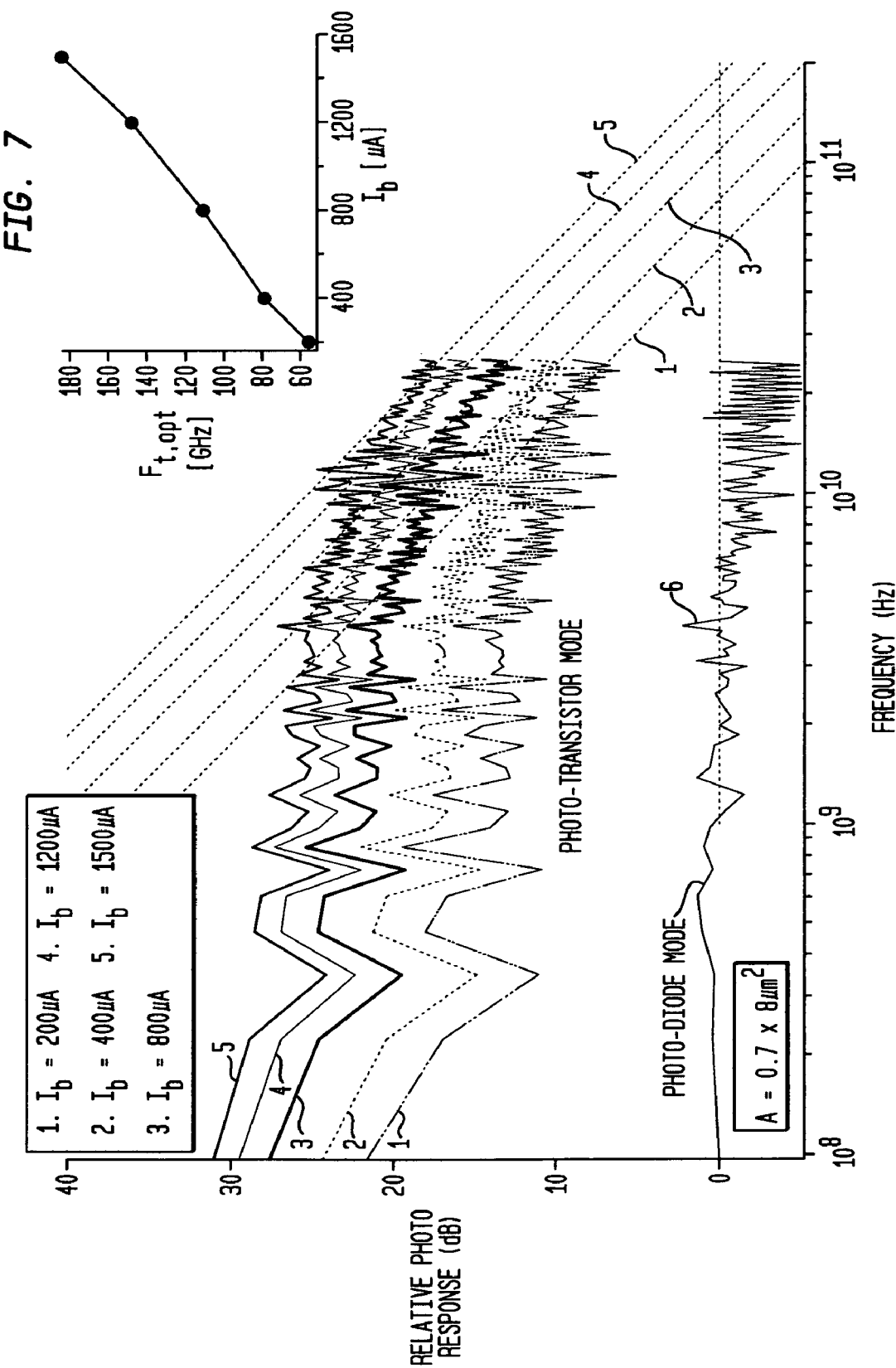

MONLITHICALLY COUPLED WAVEGUIDE AND PHOTOTRANSISTOR

BACKGROUND OF THE INVENTION

1. Field of the Invention

This invention relates to bipolar transistors and, more particularly, to bipolar phototransistors that are monolithically coupled to optical waveguides.

2. Discussion of the Related Art

Monolithic integration of photodetectors and front-end amplifiers is an appealing technology for use in high-speed optical communications systems as well as in broadband receivers with bandwidth exceeding 40 GHz. [See, for example, K. Sano, et al., *Radio Frequency Integrated Circuits* (RFIC) *Symposium*, pp 313-316 (June 2004) and M. Bitter, et al., *IEEE Photonics Technology Letters*, Vol. 12, No. 1, pp 74-76 (January 2000), both of which are incorporated herein by reference.] Monolithically integrated optical receivers comprising p-i-n photodiodes (PDs) and/or avalanche photodetectors (APDs) and heterojunction bipolar transistors (HBTs) have been used for optical detection in optical transmission systems. [See, M. Bitter et al., supra.] However, to design both type of devices (optical receivers and transistors) in one process technology concessions must be made to the epitaxial structure, resulting in limited performance for each device. [See, for example, D. Ritter, et al., *Proc. Intl. Topical Meeting Microwave Photonics*, pp 337-340 (2002), which is also incorporated herein by reference.]

The heterojunction phototransistor (HPT) is an attractive alternative to p-i-n PDs or to APDs, since both the electronics and photodetector can be fabricated from the same set of epitaxial layers, which enables device performance to be optimized. Moreover, the HPT offers relatively large optical gain since the photocurrent is amplified by the internal gain of the transistor. [See, for example, A. Leven, et al., *Electronics Letters*, Vol. 40, No. 13, pp 833-834 (June 2004), which is also incorporated herein by reference.] Monolithic integration of HBTs and HPTs opens up the possibility of fabricating cost-effective, large-scale, InP-based, optoelectronic integrated circuits (OEICs). [See, for example, H. Kamitsuna, et al., *IEEE J. of Selected Topics in Quantum Electronics*, Vol. 10, No. 4, pp 673-678 (July/August 2004) and H. Kamitsuna, et al., *IEEE Trans MTT*, Vol. 49, No. 10, pp 1921-1925 (October 2001), both of which are incorporated herein by reference.] In most prior art designs the optical input is normal to the plane of the epitaxial layers; that is, the device is top illuminated. Top illumination is typically achieved by opening a window in the emitter to permit optical access to the base, but to accommodate the opening this design utilizes a larger emitter, which results in a significant high frequency performance degradation due to increased parasitic capacitance. [See, for example, A. Leven et al., supra.]. To ensure high speed performance device dimensions need to be scaled to reduce parasitic capacitance. [See, for example, M. Rodwell, et al., *IEEE Trans Elec Dev., Vol.* 48, No. 11, pp 2606-2624 (November 2001), which is also incorporated herein by reference.]

In addition, in some prior art top illuminated designs optical radiation is absorbed in the collector and/or emitter region as well as in the base region. Disadvantageously, however, absorption in the collector/emitter regions generates minority carriers (holes in an NPN transistor) that must diffuse/drift out of these regions to be collected, a relatively slow process that limits device speed.

Thus, a need remains in the art for a bipolar phototransistor design that does not significantly degrade high frequency performance.

In particular, a need remains for a bipolar phototransistor design that has a cutoff frequency in excess of about 180 GHz.

BRIEF SUMMARY OF THE INVENTION

In accordance with one aspect of our invention, an OEIC comprises a semiconductor body, a semiconductor optical waveguide located on the body, and a bipolar phototransistor located on and optically coupled to the waveguide. In a preferred embodiment, the base region of the transistor is configured to absorb radiation propagating in the waveguide, but the emitter and collector regions are both configured not to absorb the propagating radiation.

In a further preferred embodiment, the waveguide is configured to guide radiation along a propagation axis therein, and the transistor makes an elongated footprint along the waveguide, the footprint being elongated along the direction of the propagation axis. In another preferred embodiment, the footprint has an aspect ratio of at least 3:1; that is, the footprint is at least three times longer along the propagation axis than along a direction perpendicular thereto.

Preferred embodiments comprise Group III-V compound semiconductors, particularly In-based Group III-V compound semiconductors.

BRIEF DESCRIPTION OF THE SEVERAL VIEWS OF THE DRAWING

Our invention, together with its various features and advantages, can be readily understood from the following more detailed description taken in conjunction with the accompanying drawing, in which:

FIG. 6 is a graph of small signal optical measurements in both a phototransistor mode (Curves 1-5) and a photodiode mode (Curve 6); and FIG. 7 is a graph of extracted optical gain cutoff frequencies $F_{t,opt}$ at different base currents $I_b$.

DETAILED DESCRIPTION OF THE INVENTION

General Structure

Figure 1:
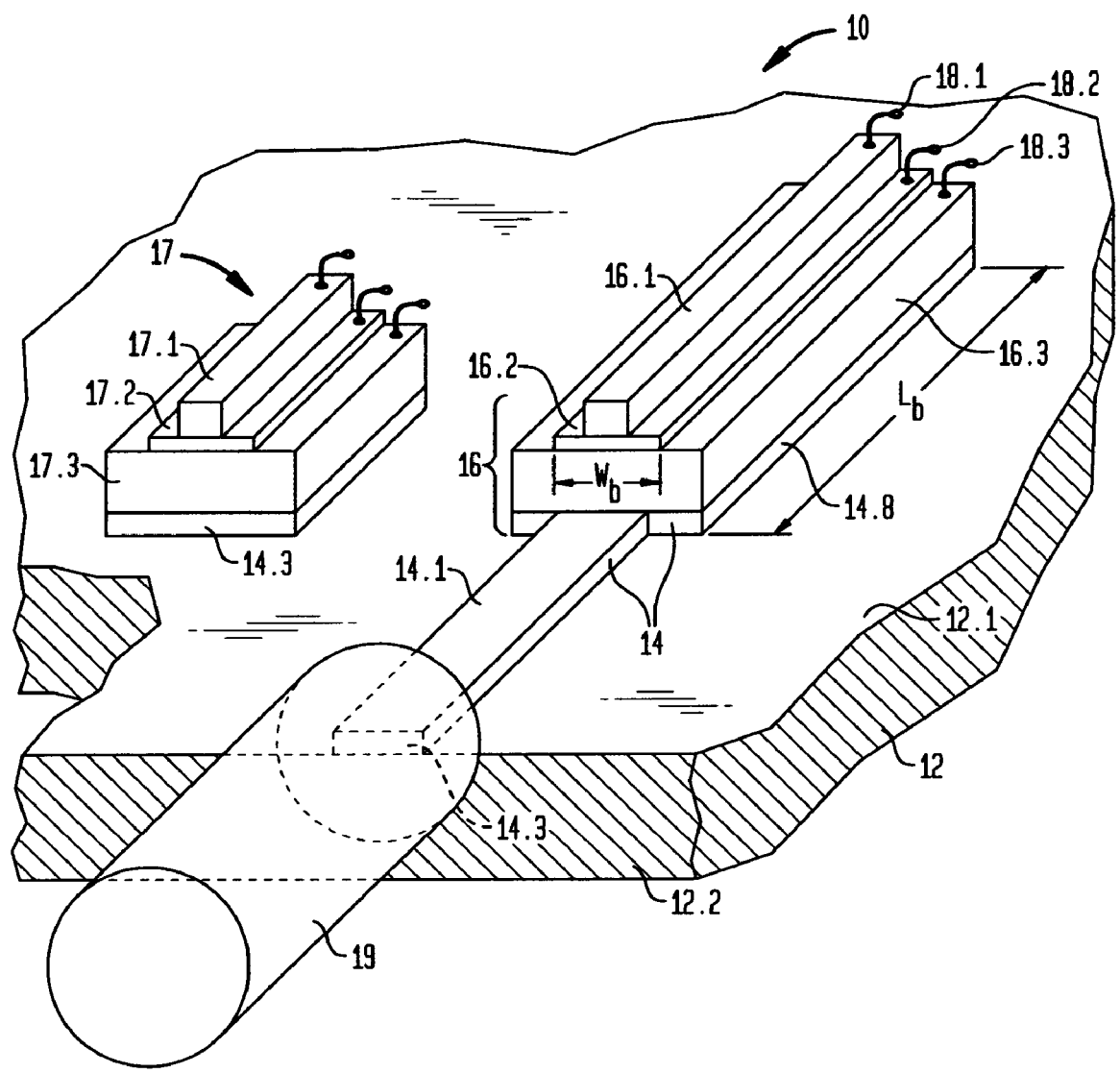
FIG. 1 is a schematic, isometric view of an optical integrated circuit (OEIC) in accordance with one embodiment of our invention.

With reference now to FIG. 1, we show an isometric view of a monolithic OEIC comprising a semiconductor body 12, a waveguide 14 integrally disposed on the body, and a bipolar phototransistor 16 located on and optically coupled to the waveguide 14. By the phrase on the body we mean to include waveguides that are at least partially embedded in the body or that are formed on top of the body. In either case the waveguide 14 is an integral part of the semiconductor body 12. Thus, in FIG. 1 waveguide 14 is formed on the top major surface 12.1 of body 12, whereas transistor 16 is formed on top of waveguide 14.

By the phrase semiconductor body we mean to include a single crystal semiconductor substrate (e.g., either a conductive substrate or a semi-insulating one), a structure comprising such a substrate with one or more epitaxial layers grown thereon, or the latter structure in which the substrate has been partially or completely removed.

In the exposition that follows we will assume that the transistor 16 is an NPN device since the majority carriers in such devices are electrons, which are known to have lower effective masses (and hence higher speeds) than holes. Those skilled in the art will understand, of course, that transistor 16 could also be a PNP device, albeit at the sacrifice of the speed of operation of the transistor and hence the OEIC. In addition, for simplicity we will assume that the body 12 is a single crystal substrate.

More specifically, the waveguide 14 includes an elongated, narrower portion 14.1 and a paddle-like, wider portion 14.2. The transistor is formed on top of the wider portion 14.2, and the narrower portion 14.1 couples a source (not shown) of optical radiation to the wider portion 14.2. The source may take on myriad forms well known to those in the art; e.g., a laser or a light emitting diode (LED) either of which is typically optically coupled to an input face 14.3 of waveguide 14 via an optical fiber 19. Illustratively, the input face 14.3 is part of a cleaved facet 12.2 of substrate 12, and fiber 19 is butt coupled to the input face 14.3. Of course, other forms of optical coupling may be utilized, including various lens arrangements well known to those skilled in the art.

Importantly, therefore, and in accordance with one aspect of our invention, the transistor 16 is preferably a bipolar heterojunction phototransistor that includes an n-type collector region 16.3 disposed on the wider waveguide portion 14.2, an n-type emitter region 16.1, and a p-type base region 16.2 disposed between the emitter and collector regions. At least the base region 16.2 is optically coupled to the narrower waveguide portion 14.2; that is, the optical field of radiation propagating in the waveguide overlaps (penetrates into) the base region 16.2. The base region 16.2 is configured to absorb the propagating radiation, thereby generating electron-hole pairs. The electrons are swept out of the base region into the collector region to produce a photocurrent. That photocurrent is amplified by the internal gain of the phototransistor 16.

To this end, the bandgap ($E_{gb}$) of the base region 16.2 is not greater than the energy ($E_o$) corresponding to the center wavelength ($\lambda_o$) of the optical radiation propagating in the waveguide 14; that is, $E_{gb} < E_o = hc/\lambda_o$, where h is Boltzmann's constant, and c is velocity of light in free space. On the other hand, the bandgap of the emitter region ($E_{ge}$) and that of the collector region ($E_{gc}$) are both greater than $E_o$.

To enhance coupling between the base region 16.2 and the waveguide portion 14.2 the footprint of the transistor is elongated along the axis of propagation of radiation in the waveguide 14. An elongated footprint means that at least the base region 16.2 of the dimension ($L_b$) of phototransistor 16 along the propagation axis is greater than its dimension ($W_b$) perpendicular thereto. Preferably, $L_b$ is at least three times greater than $W_b$, and typically is ten to twenty times greater.

In addition, to enhance confinement of the radiation propagating in the waveguide 14, it is bounded on the top and bottom by lower refractive index cladding regions. In one embodiment, the substrate 12 serves as the lower cladding region, and the bottom layer of the transistor 16 (e.g., the sub-collector layer 16.3c of FIG. 2) serves as the upper cladding region.

In order to enhance high-speed performance our OEIC has two principal features. First, the collector region 16.3 and the emitter region 16.1 are configured not to absorb any significant portion of the propagating radiation. In this way, holes are not photo-generated in either the emitter region or the collector region, and the problem of their slow diffusion rate is alleviated. On the other hand, hole generation in the base region 16.2 does not limit the speed of the transistor 16 since in steady-state many holes are present in an NPN device. The photo-generated holes leave the base region through the contacts and contribute to the external base current. In addition, the valence band step between emitter and base prevents the holes from diffusing into the emitter, and the reverse bias base-collector potential prevents the holes from entering the collector. Second, the optical radiation is not coupled into the base region 16.2 via a top illumination scheme with its attendant problem of parasitic capacitance. Instead, radiation is edge-coupled into the base region via the underlying waveguide 14.

In a preferred embodiment, the OEIC comprises a multiplicity of single crystal semiconductor layers of Group III-V compound materials epitaxially grown on a single crystal Group III-V compound substrate 12. In a further preferred embodiment, the layers and substrate are In-based semiconductor materials. For example, for OEIC operation with radiation at a center wavelength in the range of about 1.3-1.6 µm, the base region comprises In, Ga and As (e.g., InGaAs), whereas the emitter and collector regions comprise In and P (e.g., InP or InGaAsP) or In and As (e.g., InGaAlAs or InAlAs).

The OEIC 10 of FIG. 1 also depicts another device 17 that is also monolithically formed on substrate 12 along with waveguide 14 and phototransistor 16. Device 17 is intended to illustrate the fact that OEIC 10 may include, for example, other purely electronic devices formed in the same multi-layer structure from which waveguide 14 and phototransistor 16 are formed. Such devices may be interconnected (not shown) with phototransistor 16 to perform a variety of functions; e.g., further amplification of the photocurrent generated by phototransistor 16, decoding of information embedded in the photocurrent, etc.

Illustratively, device 17 is depicted as a heterojunction bipolar transistor (HBT) disposed on portion 14.3 of the waveguide layer, even though the portion 14.3 does not serve a waveguiding function. The HBT typically comprises a collector region 17.3 disposed on portion 14.3, a base region 17.2 disposed on collector region 17.3, and an emitter region 17.1 disposed on base region 17.2.

EXAMPLE

Figure 2:
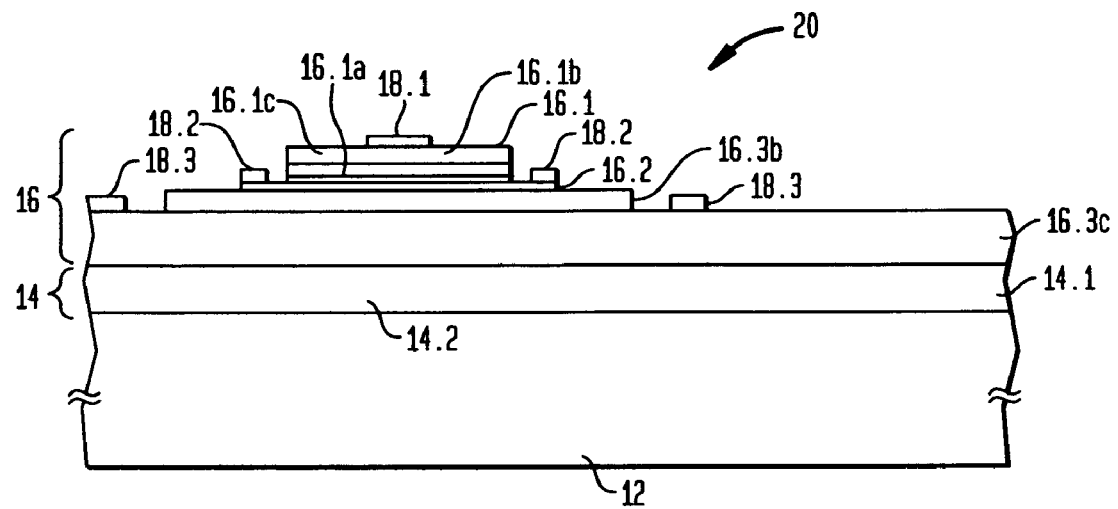
FIG. 2 is a schematic, side view of an exemplary embodiment of a portion of the OEIC of FIG. 1 in which the waveguide is optically coupled to an overlying heterojunction bipolar phototransistor.
Figure 3:
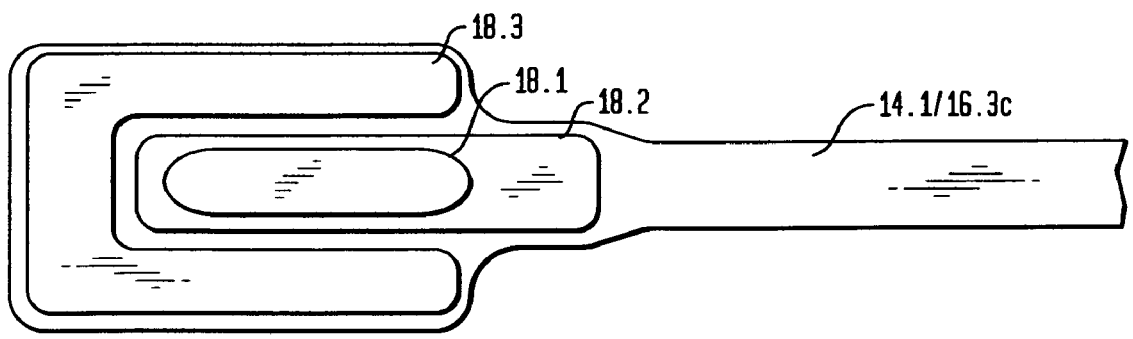
FIG. 3 is a Scanning Electron Microscope (SEM) photograph of a top view of a finished OEIC of the type shown in FIG. 2, before encapsulation, in accordance with an illustrative embodiment of our invention.

This example describes an In-based, Group III-V compound semiconductor OEIC 20 of the type shown in FIGS. 2 & 3. Various materials, dimensions and operating conditions are provided by way of illustration only and, unless otherwise expressly stated, are not intended to limit the scope of the invention.

More specifically, the OEIC 20 of this example includes a semi-insulating InP single crystal substrate 12, an InGaAlAs waveguide 14 disposed on substrate 14, and an NPN heterojunction bipolar phototransistor (HPT) 16 disposed on the waveguide 14. The compositions and thicknesses of the various layers of the OEIC are given in Table I below.

TABLE I

| LAYER | COMPOSITION | DOPING | THICKNESS |
|---|---|---|---|
| Substrate 12 | InP | Fe-doped, semi-insulating; $\rho = 1 \times 10^7$ Ω-cm | 600 μm |
| Waveguide 14 | $In_{0.52}Ga_{0.35}Al_{0.13}As$ | unintentionally doped | 3000 Å |
| Sub-collector 16.3a | InP | $n = 2 \times 10^{19}$ cm$^{-3}$ | 4000 Å |
| Collector 16.3b | $In_{0.71}Ga_{0.29}As_{0.61}P_{0.39}$ | $n = 1 \times 10^{17}$ cm$^{-3}$ | 1400 Å |
| Base 16.2 | $In_{0.53}Ga_{0.47}As$ | $p = 6 \times 10^{19}$ cm$^{-3}$ | 500 Å |
| Emitter 16.1a | InP | $n = 2 \times 10^{19}$ cm$^{-3}$ | 700 Å |
| Emitter 16.1b | InP | $n = 8 \times 10^{17}$ cm$^{-3}$ | 300 Å |
| Emitter 16.1c | $In_{0.53}Ga_{0.47}As$ | $n = 6 \times 10^{19}$ cm$^{-3}$ | 1500 Å |

By unintentionally doped we mean that, in general, a dopant is not deliberately added to the layer; rather, any doping of the layer that might occur results from background contamination in the chamber used to grow the layer.

Table I indicates that the both the collector and emitter regions were multi-layered. The n-type collector region 16.3 comprised a highly doped InP sub-collector 16.3a and a lowly doped collector 16.3b. On the other hand, the n-type emitter region 16.1 comprised a highly doped InP layer 16.1a formed on base layer 16.2, a lowly doped InP depleted layer 16.1b formed on layer 16.1a, and a highly doped InGaAs layer 16.1c formed on layer 16.1b.

The phototransistors were fabricated using our standard double heterojunction bipolar transistor (DHBT) process as described by Y. Yang, et al., *GaAs Digest*, pp. 269-272 (2002), which is incorporated herein by reference. We used the same epitaxial layer structure to fabricate the HPT and the DHBT. However, since the phototransistors were integrated with waveguides, we did modify the DHBT epitaxial layer structure and process flow (in a straightforward fashion) to accommodate the waveguide layer. These modifications, however, did not compromise the high-speed performance of our DHBTs and HPTs.

The phototransistors could also be fabricated using the ion-implantation and other processes described by Y-K Chen et al. in U.S. Pat. No. 6,911,716 issued on Jun. 28, 2005. In particular, the sub-collector 16.3a could be replaced by an ion-implanted layer in the substrate 12.

Using primarily Metal-Organic Molecular Beam Epitaxy (MOMBE), we grew the DHBT and HPT structures on 2-inch diameter, 600 μm thick, Fe-doped semi-insulating InP substrates 12 having a resistivity of $1\times10^7$ Ω-cm. More specifically, the InGaAlAs waveguide layer 14 had a thickness of 3000 Å, but it was grown separately by Solid-Source Molecular Beam Epitaxy (SSMBE). The InGaAs base layer 16.2 was 500 Å thick and was doped p-type with Carbon (C). The base layer had an activated doping concentration as high as $6\times10^{19}$ cm$^{-3}$. The wide bandgap InP sub-collector 16.3a was 4000 Å thick and was doped n-type with Silicon (Si) to $2\times10^{19}$ cm$^{-3}$. The InGaAsP collector layer 16.3b was 1400 Å thick layer and was doped n-type with Tin (Sn) to $1\times10^{17}$ cm$^{-3}$. The emitter region 16.1 comprised a multi-layered structure: a highly doped InP layer 16.1a formed on the base layer 16.2, a lowly doped InP layer 16.1b formed on InP layer 16.1a, and an InGaAs layer 16.1c formed on InP layer 16.1b. InP layer 16.1a was 700 Å thick and was doped n-type with Si to $2\times10^{19}$ cm$^{-3}$; InP layer 16.1b was 300 Å thick and was doped n-type with Si to $8\times10^{17}$ cm$^{-3}$; and InGaAs layer 16.1c was 1500 Å thick and was doped n-type with Si to $6\times10^{19}$ cm$^3$.

The emitter, base and collector regions had approximately rectangular shapes with dimensions as follows: emitter 16.1 (0.7 μm×8 μm), base 16.2 (1.7 μm×10.3 μm), and collector 16.3b (4.9 μm×12.3 μm). These regions were all defined using well-known optical stepper lithography followed by $Cl_2$-based, dry (plasma) etching.

From these dimensions it is apparent that the elongated footprint of the transistor 20, as measured by the size of its base region 16.2, had an aspect ratio of approximately 6:1 (10.3 μm/1.7 μm).

Note, a single type of MBE may be used to fabricate both quaternary layers. In addition, both quaternary layers may comprise the same material.

The SEM of FIG. 3 shows the shapes of the metallic emitter, base and collector electrodes: the emitter electrode 18.1 had an oblong shape; the base electrode 18.2 had an annular shape that surrounded the emitter region; and the collector electrode 18.3 had a U-shape that partially surrounded the emitter and base regions.

After processing, the wafer was thinned down and cleaved to provide facets 12.2 for optical input to the waveguide 14. The remainder of the processing steps is described in more detail in Yang et al., supra.

Figure 4:
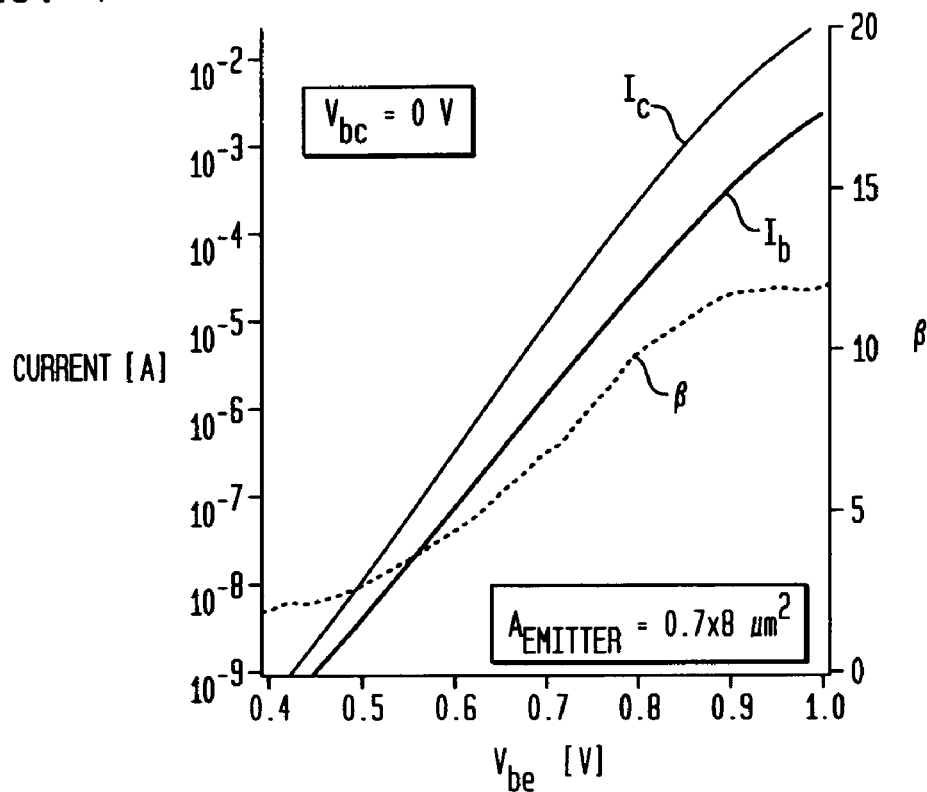
FIG. 4 is a Gummel plot of the OEIC of FIGS. 2-3 in which the transistor has a rectangular emitter measuring 0.7 µm×8 µm.

Our OEICs were tested to verify the presence of transistor action in the HPTs and to confirm their high speed performance. Thus, FIG. 4 depicts a Gummel plot of an HPT with emitter dimensions/area of A=0.7 μm×8 μm=5.6 μm². From this figure it is apparent that the HPT exhibits transistor action ($I_c > I_b$) over a wide current range and has a DC current gain of $\beta \sim 12$ for $V_{be} > 0.85$ V.

Figure 5:
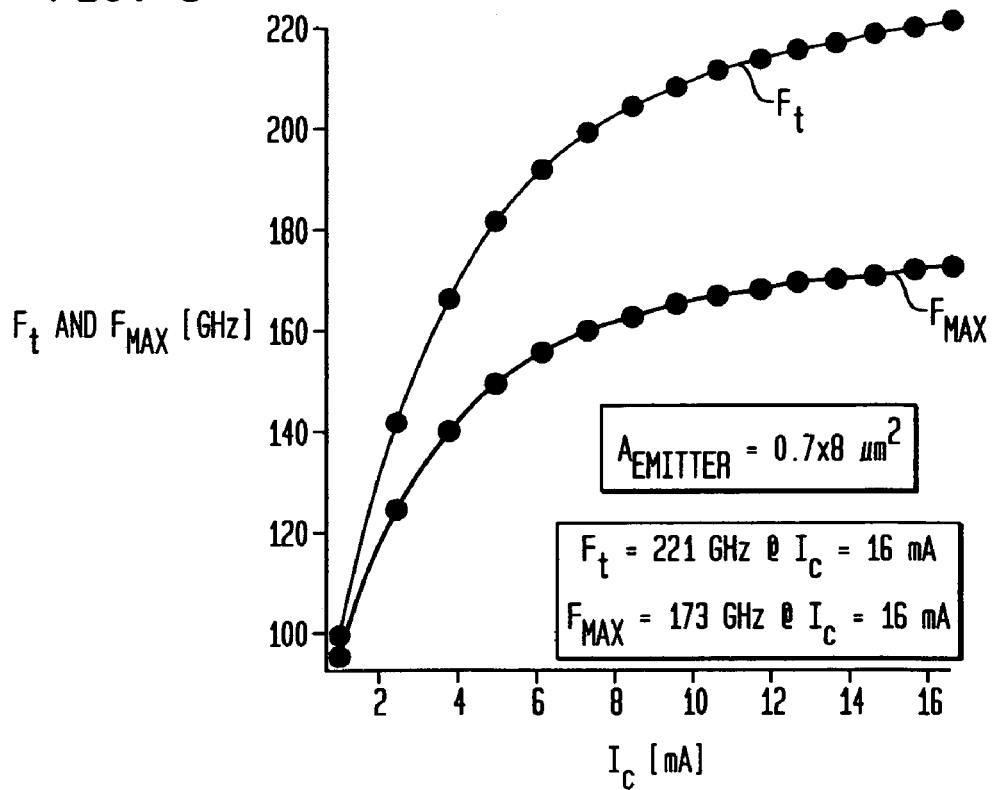
FIG. 5 is a graph of current gain cutoff frequency ($F_t$) and maximum oscillation frequency ($F_{max}$) of an HBT having a rectangular emitter measuring 0.7 µm×8 µm.

The microwave performance was characterized by on-wafer S-parameter measurements from DC up to 60 GHz. FIG. 5 shows the cut-off frequency $F_t$ and maximum oscillation frequency $F_{max}$ as a function of collector current $I_c$ at $V_{cc}=1.5$ V. We measured a maximum cutoff frequency $F_t$ of 221 GHz and maximum oscillation frequency $F_{max}$ of 173 GHz at a collector current of $I_c=16$ mA.

Optical on-wafer characterization was carried out at λ=1.55 μm using a 50 GHz lightwave component analyzer commercially available from Agilent Technologies, Palo Alto, Calif. FIG. 6 displays the measured frequency photoresponse of our HPTs in both the photodiode mode (Curve 6) and the transistor-mode (Curves 1-5) operation. The optical gain cutoff frequency $F_{t,opt}$ is defined as the intersection of the interpolated −20 dB/decade frequency response with the low-frequency response of the phototransistor in the photo-diode mode. [See, A. Leven et al., supra] An internal optical gain of close to $G_{opt}=30$ dB was observed.

As shown in FIG. 7, we measured a maximum optical gain cutoff frequency $F_{t,opt}$ of 184 GHz at a base current of $I_b=1500$ μA using an HPT having emitter dimensions/area of A=0.7 μm×8 μm=5.6 μm². To the best of our knowledge, this is the highest $F_{t,opt}$ reported to date for a phototransistor.

The measured optical gain cutoff frequency of the HPT was close to the measured electrical cutoff frequency $F_t$ and only about 40 GHz lower. It should be noted, however, that for the electrical S-parameter measurements, the measurement frame was de-embedded, while for the optical gain cutoff frequency measurements no de-embedding was performed. Because of the thin base absorption layer and the low coupling of the light from the waveguide to the phototransistor, the intrinsic responsivity was rather low. We estimated that the intrinsic responsivity of our devices was about 10$^{-3}$ A/W, which can be improved significantly by a different design of the waveguide layer of the type described by J. P. Vilcot, *Proc. EDMO*, pp 163-168 (1997), which is incorporated herein by reference. By improving the mode confinement of the waveguide layer we expect at least an order of magnitude improvement in responsivity based on our simulations. For example, increasing mode confinement parallel to the substrate and/or decreasing it perpendicular to the substrate will enhance optical coupling between the waveguide and the base region. Alternatively, such enhanced coupling can also be achieved by inserting a well-known index-matching layer between the waveguide and the base region.

It is to be understood that the above-described arrangements are merely illustrative of the many possible specific embodiments that can be devised to represent application of the principles of the invention. Numerous and varied other arrangements can be devised in accordance with these principles by those skilled in the art without departing from the spirit and scope of the invention. In summary, we have demonstrated a sub-micron, high-speed phototransistor (HPT) monolithically integrated with an optical waveguide based on our InP double hetrojunction bipolar transistor (DHBT) process technology. By using an edge-illuminated HPT device, we were able to aggressively scale emitter dimensions (to sub-micron widths instead of micron widths), resulting in high frequency performance. Because we used only the highly doped p-type base as an absorption layer, instead of both the base and collector, we avoided the presence of slow drifting holes in the collector layer and their limitation on the bandwidth. Since electrons are the active carriers in the base of our devices, their transport will determine the overall (optical) speed of our HPTs. Compare the carrier transport in a uni-travelling-carrier photodiode, as described by H. Ito, et al., *Proc. LEOS*, San Diego, Calif., Vol. 1 pp 386-387 (2001), which is incorporated herein by reference.

We claim:

1. Wherein said waveguide includes an elongated, relatively narrow portion and a wider, paddle-like portion optically coupled thereto, said phototransistor being disposed on said paddle-like portion.

2. Wherein said waveguide is configured to guide optical radiation along a propagation axis therein, and wherein said phototransistor comprises base, emitter and collector regions, said base region being configured to absorb said radiation and said collector and emitter regions being configured not to absorb said radiation.

3. The apparatus of claim 2, wherein said base region has a bandgap narrower than that of either said emitter or collector regions.

4. The apparatus of claim 3, wherein said base region comprises In, Ga and As.

5. The apparatus of claim 4, wherein said emitter and collector regions comprise In and P or In and As.

6. Wherein said waveguide is formed on a major surface of said body and said phototransistor includes a bottom layer in contact with said waveguide, and wherein said waveguide includes a pair of cladding layers, one of said cladding layers comprising a portion of said body along said surface and the other of said cladding layers comprising said bottom layer.

7. An optical integrated circuit comprising:
a semiconductor body,
a semiconductor optical waveguide located on said body, said waveguide being configured to carry optical radiation at particular center wavelength, and
a bipolar heterojunction phototransistor located on and optically coupled to said waveguide,
said phototransistor comprising base, emitter and collector regions, said base region being configured to absorb radiation at said wavelength and said emitter and collector regions both being configured not to absorb said radiation at said wavelength.

8. The circuit of claim 7, wherein said base region has a bandgap narrower than that of either said emitter or collector regions.

9. The circuit of 8, wherein said body comprises an In-based semiconductor, said base region comprises In, Ga and As, and said emitter and collector regions comprise In and P or In and As.

10. An optical integrated circuit comprising:
a semiconductor body,
a semiconductor optical waveguide located on said body, said waveguide being configured to carry optical radiation at particular center wavelength, and
a bipolar heterojunction phototransistor located and optically coupled to said waveguide,
said waveguide being configured to guide said radiation along a propagation axis therein, and said phototransistor making a footprint along said waveguide, said footprint being elongated along the direction of said axis, and said footprint being at least three times longer along said axis than along a direction perpendicular thereto.

11. The circuit of claim 10, wherein said footprint is at least ten times longer along said axis than along a direction perpendicular thereto.

12. An optical integrated circuit comprising:
a semiconductor body,
a semiconductor optical waveguide located on said body, said waveguide being configured to carry optical radiation at particular center wavelength, and said waveguide including an elongated, a relatively narrow portion and a wider, paddle-like portion optically coupled thereto, and
a bipolar heterojunction phototransistor located on and optically coupled to said paddle-like portion of said waveguide,
said waveguide being configured to guide said radiation along a propagation axis therein,
said waveguide being formed on a major surface of said body, said phototransistor including a bottom layer in contact with said waveguide, and said waveguide including a pair of cladding layers, one of said cladding layers comprising a portion of said body along said surface and the other of said cladding layers comprising said bottom layer,
said phototransistor making a footprint along said waveguide, said footprint being elongated along the direction of said axis, and said footprint being at least three times longer along said axis than along a direction perpendicular thereto, and
said phototransistor comprising base, emitter and collector regions, said base region being configured to absorb radiation at said wavelength and said emitter and collector regions both being configured not to absorb said radiation at said wavelength.

13. The circuit of claim 12, wherein said base region has a bandgap narrower than that of either said emitter or collector regions.

14. The circuit of 13, wherein said body comprises an In-based semiconductor, said base region comprises In, Ga and As, and said emitter and collector regions comprise In and P or In and As.

* * * * *